United States Patent

Cabasso et al.

[11] Patent Number: 5,486,590
[45] Date of Patent: Jan. 23, 1996

[54] SULFONATED POLYETHYLENE REARRANGEMENT OF POLYORGANOSILOXANES

[75] Inventors: Israel Cabasso, Syracuse, N.Y.; Daniel Graiver, Midland, Mich.

[73] Assignee: Dow Corning Corporation, Midland, Mich.

[21] Appl. No.: 386,040

[22] Filed: Feb. 9, 1995

[51] Int. Cl.$^6$ .................................................. C08G 77/08
[52] U.S. Cl. ........................................... 528/23; 525/100
[58] Field of Search ................................ 528/23; 525/100

[56] References Cited

U.S. PATENT DOCUMENTS 3,694,405  9/1972  Litteral .......................... 260/46.5 R
4,310,679  1/1982  Finke et al. ....................... 556/462
4,855,381  8/1989  Mutoh et al. ....................... 528/23

*Primary Examiner*—Ralph H. Dean
*Attorney, Agent, or Firm*—William F. Boley

[57] ABSTRACT

A process for the rearrangement of polyorganosiloxanes using solid sulfonated polyethylene as a rearrangement catalyst. The process comprises contacting polyorganosiloxanes at a temperature within a range of about 20° C. to 110° C. with a rearrangement catalyst consisting essentially of a solid sulfonated polyethylene. In a preferred process, the solid sulfonated polyethylene is in the form of hollow fibers through which the polyorganosiloxanes are passed to effect rearrangement.

12 Claims, No Drawings

SULFONATED POLYETHYLENE REARRANGEMENT OF POLYORGANOSILOXANES

BACKGROUND OF INVENTION

The present invention is a process for the rearrangement of polyorganosiloxanes using solid, sulfonated polyethylene as a rearrangement catalyst. In a preferred process the solid, sulfonated polyethylene is in the form of hollow fibers through which the polyorganosiloxanes are passed to effect rearrangement.

It is known that polyorganosiloxanes can be prepared by rearrangement reactions, the silicon-oxygen-silicon bonds being rearranged virtually arbitrarily. Rearrangement reactions of polyorganosiloxanes are catalyzed by strong bases and strong acids. Polyorganosiloxane rearrangements catalyzed by strong acids and bases are frequently used in the industrial preparation of polyorganosiloxanes with a relatively high molecular weight from polyorganosiloxanes with a relatively low molecular weight, and vice versa.

The catalysts typically used for the rearrangement of polyorganosiloxanes are strong bases, such as alkali metal bases, for example lithium oxide, sodium hydroxide, potassium alkoxides, potassium silanolates, and cesium hydroxide; quaternary bases, such as tetraalkylammonium hydroxides and alkoxides and tetraalkylphosphonium hydroxides and alkoxides; and strong acids such as complex Lewis acids, hydrogen halide acids, sulfuric acid, boric acid, and trifluoromethylsulphonic acid. In addition, acid treated support materials such as carbon, silicates, and clays have been described as useful rearrangement catalysts for polyorganosiloxanes.

The "mobile" catalysts such as the alkali metal bases potassium hydroxide and cesium hydroxide; quaternary bases such as tetraalkylammonium hydroxide; and strong acids such as sulfuric acid and trifluoromethyl sulfonic acid typically require a process to neutralize the catalyst at the completion of the rearrangement process. This neutralization is necessary to provide for storage stability of the rearranged polyorganosiloxanes. Since many applications for polyorganosiloxanes, for example those used as electrical insulating oils, require pure, salt-free polyorganosiloxane it is necessary to remove these salts.

The present process provides an advantage of being simpler in comparison to those processes using mobile catalyst for rearrangement of polyorganosiloxanes. When the solid sulfonated polyethylene catalyst of the present process is used, the process of neutralization and the removal of the resulting salts are eliminated. The catalyst according to the present invention is either fixed in the reactor or it is retained by built-in fitments such as sieves. Therefore, the present process can be advantageously run as a continuous process with extended use of the solid sulfonated polyethylene rearrangement catalyst and with no need to neutralize the rearranged polyorganosiloxane product.

Litteral, U.S. Pat. No. 3,694,405 describes the use of a packed-bed of a macroreticular sulfonic acid cation exchange resin having a specific pore volume of at least about 0.01 cc per gram as a rearrangement catalyst for polyorganosiloxanes. Litteral teaches such resin can be prepared by sulfonating a reticulate copolymer of styrene and a polyvinylidene monomer, such as divinylbenzene, trivinylbenzene, as well as polyvinyl ethers of polyhydric alcohols, such as divinyloxyethane and trivinyloxypropane. The sulfonating agent can be concentrated sulfuric acid, oleum, sulfur trioxide or chlorosulfonic acid.

Finke et al., U.S. Pat. No. 4,310,679 teach the rearrangement of polyorganosiloxanes in the presence of a cation exchange resin, where the resin employs a polymer having side chains carrying sulfonyl groups and the carbon atoms carrying the sulfonyl groups also carrying at least one fluorine atom (e.g. Nafion®, DuPont Corporation, Wilmington, Del.).

The present invention uses solid sulfonated polyethylene as a rearrangement catalyst for polyorganosiloxanes. The solid sulfonated polyethylene is a relatively low-cost material that can be easily separated from the polyorganosiloxanes. The solid sulfonated polyethylene rearrangement catalyst can be in the form of hollow fibers through which the polyorganosiloxanes are passed to effect rearrangement.

SUMMARY OF INVENTION

The present invention is a process for the rearrangement of polyorganosiloxanes using solid sulfonated polyethylene as a rearrangement catalyst. The process comprises contacting polyorganosiloxanes at a temperature within a range of about 20° C. to 110° C. with a rearrangement catalyst consisting essentially of a solid sulfonated polyethylene. In a preferred process, the solid sulfonated polyethylene is in the form of hollow fibers through which the polyorganosiloxanes are passed to effect rearrangement.

DESCRIPTION OF INVENTION

The present invention is a process for siloxane bond rearrangement of polyorganosiloxanes, the process comprises: contacting a polyorganosiloxane at a temperature within a range of about 20° C. to 110° C. with a rearrangement catalyst consisting essentially of solid sulfonated polyethylene.

The present process is not restricted to a certain group of polyorganosiloxanes and can be applied to all polyorganosiloxanes in which the organosiloxanes are a mixture or a single compound selected from a group containing at least one structure of the formula:

$$(Y)_a SiO_{4-a} \tag{1}$$

where each Y is independently selected from a group consisting of substituted or unsubstituted monovalent hydrocarbon groups, and a has a value from one to three inclusive. Preferably, Y comprises one to about 30 carbon atoms.

Examples of unsubstituted monovalent hydrocarbon groups Y in formula (1) include alkenyls (e.g. vinyl and allyl), alkyls (e.g. methyl, ethyl, pentyl, and 2 ethylhexyl), aryls (e.g. phenyl, 2-naphthyl, 2-anthracyl, and biphenyl), cycloalkyls (e.g. cyclopentyl, cyclohexyl, and cyclooctyl), alkaryls (e.g. 4-methylphenyl, 2,4-diethylphenyl and dodecylphenyl), aralkyls (e.g. benzyl and phenylethyl), cycloalkenyls (e.g. cyclohexenyl), alkoxys (e.g. methoxy, ethoxy, propoxy, dodecyloxy, and isopropoxy), aryloxys (e.g. phenoxy, naphthyloxy, and biphenyloxy) and acyloxys (e.g. acetoxy).

The polyorganosiloxanes according to the present invention can contain in their molecules units $YSiO_{3/2}$, $Y_2SiO_{2/2}$, and $Y_3SiO_{1/2}$. The polyorganosiloxanes can also contain quadrivalent units $SiO_{4/2}$ in addition to the units mentioned above.

Preferred polyorganosiloxanes which can be rearranged according to the present invention are to be found in particular in a broad range of linear and cyclic polyorganosiloxanes or mixtures thereof where the linear polyorganosiloxanes are described by formula $$R_3Si(OSiR_2)_pOSiR_3 \qquad (2)$$

where R is hydrogen or a monovalent substituted or unsubstituted hydrocarbon radical comprising one to 30 carbon atoms, preferred is where R comprises one to 18 carbon atoms, and p is a positive integer equal to or greater than zero, and cyclic polyorganosiloxanes described by formula $$(R_2SiO)_q \qquad (3)$$

where q is an integer greater than two and R is as described above.

The substituent R can be, for example, an alkyl, alkenyl, arylalkyl, aryl, alkoxy, acyloxy, or organosiloxy group and such groups substituted with for example halogen atoms or mercapto groups. The substituent R can be, for example, alkyls groups such as methyl, ethyl, propyl, tert-butyl, octadecyl, 2-ethylhexyl; alkenyl groups such as vinyl and allyl; aryl groups such as phenyl, 2-naphthyl, and 2 anthracyl; alkaryl groups such as 4-methylphenyl, 2,4-diethylphenyl, and 4-dodecylphenyl; and araalkyl groups such as phenylmethyl. The substituent R can be substituted with, for example, halogens or mercapto groups. The substituted substituent R can be for example 3,3,3-trifluoropropyl, perfluoropropyl, and chloropropyl.

It is preferred that each R be independently selected from a group consisting of hydrogen, methyl, vinyl, phenyl, and 3,3,3-trifluoropropyl. Most preferred is when greater than about 90 mole percent of the R substituents is methyl and any remaining R substituents, if present, are selected from a group consisting of hydrogen and vinyl.

There is no specific restriction with regard to the molecular weight of the polyorganosiloxanes which can be rearranged in the present invention. The sole restriction in practice is that the feed mixture have a viscosity which will allow adequate contact with the solid sulfonated polyethylene to effect rearrangement of the polyorganosiloxanes.

Generally it is preferred that when the feed is a linear polyorganosiloxane as described by formula (2) that the value p be within a range of about zero to 40. When the feed is a polyorganocyclosiloxane as described by formula (3) it is preferred that q have a value within a range of about three to 20. More preferred is when q has a value within a range of about three to six.

The process conditions for carrying out the invention are not critical within narrow limits. The temperature at which the rearrangement reaction is conducted can be within a range of about 20° C. to 110° C. Generally, the higher the temperature the faster the rearrangement process occurs. However at a temperature greater than about 110° C., the solid sulfonated polyethylene may deteriorate. A preferred temperature is within a range of about 50° C. to 100° C.

The process can be carried out at atmospheric pressure, but pressure above and below atmospheric pressure can also optionally be used.

The rearrangement of polyorganosiloxanes by the present process is a reversible process, therefore polyorganosiloxanes with a low molecular weight can be converted into high polymers and in reverse high polymers can be converted into siloxanes with a low degree of polymerization. Such reversible rearrangement reactions can be continued in the presence of a solid sulfonated polyethylene catalyst until an equilibrium mixture of various cyclic and linear siloxanes is formed. For example in the case of polyorganocyclosiloxanes being used as an initial feed to the process, an equilibrium mixture can be achieved comprising a minor fraction of cyclic siloxanes and a major fraction of linear siloxanes. Therefore, for example, in a continuous process it is possible to strip the cyclic siloxanes and low molecular weight linear siloxanes from a reaction mixture exiting the reactor and recycle these low-molecular weight materials to the reactor. Thereby, essentially all of the feed material can be converted into higher molecular weight linear polyorganosiloxanes.

A solvent may be used in the present process to reduce the viscosity of higher molecular weight polyorganosiloxanes and facilitate their contact with the solid sulfonated polyethylene catalyst. A solvent may also be used to shift the equilibrium of the process to provide for a higher equilibrium concentration of polyorganocyclosiloxanes.

Solvents which are suitable as diluents in the present process are any inert organic solvent. The solvent chosen will depend on the polyorganosiloxanes used. Generally preferred are non-hygroscopic organic solvents including, for example, aromatic hydrocarbons such as xylene, toluene, benzene, and naphthalene, and aliphatic hydrocarbons, such as n-hexane, n-octane, and n-nonane. Other useful hygroscopic organic solvents may include ethers such as diethyl ether, di-n-butyl ether, tetrahydrofuran and dioxane; amides such as N,N-dimethylformamide and N,N-dimethylacetamide; ketones such as acetone, dimethyl ketone, methyl ethyl ketone, and methyl isobutyl ketone; and esters such as ethyl acetate, isopropyl acetate, isobutyl acetate and methyl propionate.

The present process requires the present of a rearrangement catalyst consisting essentially of a solid sulfonated polyethylene. By "solid" it is meant that the polyethylene is crosslinked sufficiently to maintain its physical integrity during conduct of the present process. Cross-linking of the polyethylene may be effect during sulfonation of the polyethylene. The type of polyethylene useful in the present process is not limiting and can be any of those known in the art such as ultra-high density polyethylene, high-density polyethylene, and low density polyethylene. The physical form of the polyethylene will depend upon the type reactor in which it is desired to run the present process. The polyethylene can be in the form of, for example, sheets, particles, pellets, rods, extrusions, moldings, solid fibers, and hollow fibers. In a preferred embodiment of the present process, the polyethylene is in the form of one or more hollow fibers or bundles thereof.

The method of sulfonating the polyethylene is not critical to the present process and can be any of those known in the art. A useful example of a method for sulfonating the polyethylene is that of chlorosulfonation as illustrated in Example 1 herein. The sulfonic acid groups substituted on the solid polyethylene function as a catalyst to effect the rearrangement of polyorganosiloxanes. Therefore, any amount of sulfonation of the solid polyethylene which facilitates the rearrangement of polyorganosiloxanes is useful in the present process. However, preferred is when the solid sulfonated polyethylene contains about 0.1 to 5 meg of sulfonic acid groups per gram of solid polyethylene.

The length of time required for the polyorganosiloxanes to contact the sulfonated polyethylene to effect rearrangement will depend upon such factors as the chemical structure of the polyorganosiloxane, the temperature at which the process is conducted, and the degree of polymerization desired for the product. Generally, a total contact time of about 0.5 hours up to several days is considered useful.

When the process is run as a continuous process, multiple passes through the reactor of polyorganosiloxanes to be rearrange may be performed.

The present process can be conducted as a continuous, semi-continuous, or batch process. The process can be conducted as a continuous process using a fixed-bed of solid sulfonated polyethylene. Preferred is when the process is run as a continuous process using multiple bundles of sulfonated polyethylene hollow-fibers through which the polyorganosiloxane is passed to effect rearrangement. The effluent from the reactor in which the present process is conducted can be subjected to chemical separation processes such as stripping off of solvent, solvent extraction, flash distillation, fractional distillation and the like in order to recover the desired product. The undesired fractions can then be recycled to the process for further rearrangement.

The following examples are provided to illustrate the present invention. These examples are not intended to limit the scope of the claims provided herein.

EXAMPLE 1

The ability of solid sulfonated polyethylene (SPE) to catalyze the polymerization of hexamethylcyclotrisiloxane ($D_3$), octamethylcyclotetrasiloxane ($D_4$), and decamethylcyclopentasiloxane ($D_5$) was evaluated.

Polyethylene flat-sheeting having a thickness of about 0.75 mm was acquired from Petrochemical Industries, Haifa, Israel (Polyethylene-100, d=0.921 g/cm$^3$). The sheeting was chlorosulfonated by immersing for six hours at room temperature in a sulfur dioxide/chlorine gas mixture (3:1 volume ratio) in visible light. The chlorosulfonated polyethylene sheeting was then immersed in 1N NaOH at 50° C. for two days to hydrolyze the pendant sulfonyl chloride groups (—$SO_2Cl$) to sulfonic groups (—$SO_3Na+$). The sulfonic acid form was obtained by treating the sheeting with 1N HCl at room temperature for four hours. The SPE sheeting was then washed with deionized water and dried under vacuum. The milli-equivalence (meq) of sulfonic acid groups per gram of polyethylene was determined by titration with NaOH and found to be 1.5 meq/g.

Polymerization of the cyclosiloxanes was carried out under a dry nitrogen atmosphere in a three-neck flask equipped with a reflux condenser, magnetic stirrer, and a rubber septum for removal of sample during the course of the polymerization. About 67 mmol of $D_3$, $D_4$, or $D_5$ was added to the flask and the flask was heated in a controlled-temperature oil bath to 90° C. Then sufficient amount of 1×5 centimeter strips of the SPE sheeting were added to provide 0.37 mmol of —$SO_3H$ to the process. Samples were removed at the times described in Table 1 and analyzed for viscosity (CP=centipoise) using a Brookfield Viscometer (Model DV-II+) and monomer conversion was determined using 300 MHz 1H-NMR (Bruckner AMX MHz spectrometer, CDC3 solution).

TABLE 1

SPE Catalyzed Polymerization of Cyclopolysiloxanes

| Monomer | Time (h) | Viscosity (CP) | Monomer Conversion (%) |
|---|---|---|---|
| $D_3$ | 4 | 45 | 32.7 |
| $D_3$ | 12 | 2050 | 67.8 |
| $D_3$ | 24 | 7085 | 89.7 |
| $D_3$ | 48 | 11000 | 92.3 |
| $D_3$ | 72 | 24680 | 96.8 |

TABLE 1-continued

SPE Catalyzed Polymerization of Cyclopolysiloxanes

| Monomer | Time (h) | Viscosity (CP) | Monomer Conversion (%) |
|---|---|---|---|
| $D_3$ | 96 | 49590 | 98.0 |
| $D_3$ | 120 | 46980 | 99.0 |
| $D_3$ | 168 | 48100 | 99.0 |
| $D_4$ | 1 | 1 | 1.6 |
| $D_4$ | 4 | 25 | 12.0 |
| $D_4$ | 7 | 85 | 19.7 |
| $D_4$ | 12 | 120 | 34.4 |
| $D_4$ | 22 | 835 | 73.9 |
| $D_4$ | 30 | 2846 | 87.1 |
| $D_4$ | 96 | 43820 | 89.4 |
| $D_4$ | 120 | 43740 | 87.9 |
| $D_4$ | 168 | 43100 | 88.1 |
| $D_5$ | 4 | 2 | 0.0 |
| $D_5$ | 12 | 2 | 0.0 |
| $D_5$ | 24 | 2 | 1.0 |
| $D_5$ | 48 | 2 | 2.0 |
| $D_5$ | 72 | 2 | 2.0 |
| $D_5$ | 120 | 15 | 5.0 |
| $D_5$ | 168 | 25 | 6.8 |

EXAMPLE 2.

The effect of temperature on the solid, sulfonated polyethylene catalyzed polymerization of octamethylcyclotetrasiloxane ($D_4$) was evaluated.

Sulfonated polyethylene sheeting prepared as described in Example 1 was contacted with $D_4$ by the same process as described in Example 1. The temperatures evaluated are described in Table 2. Samples were removed from the reaction flask at times indicated in Table 2 and viscosity and monomer conversion determined by the methods described in Example 1. The results of these analysis are reported in Table 2.

TABLE 2

Effect of Temperature on SPE Catalyzed Polymerization of $D_4$

| Temp. (°C.) | Time (h) | Viscosity (CP) | Monomer Conversion (%) |
|---|---|---|---|
| 70 | 24 | 1 | 0.0 |
| 70 | 48 | 1 | 1.0 |
| 70 | 72 | 15 | 4.6 |
| 70 | 120 | 35 | 12.7 |
| 70 | 144 | 60 | 14.8 |
| 70 | 168 | 90 | 21.6 |
| 70 | 192 | 180 | 29.9 |
| 70 | 216 | 240 | 35.1 |
| 70 | 240 | 260 | 42.6 |
| 80 | 24 | 1 | 2.8 |
| 80 | 72 | 20 | 3.5 |
| 80 | 96 | 40 | 6.1 |
| 80 | 120 | 60 | 17.5 |
| 80 | 168 | 125 | 28.5 |
| 80 | 192 | 395 | 53.8 |
| 80 | 216 | 4210 | 67.9 |
| 80 | 240 | 12490 | 78.4 |
| 85 | 1 | 1 | 0.0 |
| 85 | 4 | 20 | 1.2 |
| 85 | 8 | 50 | 9.2 |
| 85 | 24 | 475 | 42.1 |
| 85 | 48 | 1848 | 67.2 |
| 85 | 72 | 4650 | 78.0 |
| 85 | 96 | 7845 | 84.0 |
| 85 | 120 | 14200 | 87.0 |
| 85 | 168 | 19800 | 86.0 |
| 90 | 1 | 1 | 1.6 |
| 90 | 4 | 25 | 12.0 |

TABLE 2-continued

Effect of Temperature on SPE Catalyzed Polymerization of $D_4$

| Temp. (°C.) | Time (h) | Viscosity (CP) | Monomer Conversion (%) |
|---|---|---|---|
| 90 | 7 | 85 | 19.7 |
| 90 | 12 | 120 | 34.4 |
| 90 | 22 | 835 | 73.9 |
| 90 | 30 | 2846 | 87.1 |
| 90 | 96 | 43820 | 89.4 |
| 90 | 120 | 43740 | 87.9 |
| 90 | 168 | 43100 | 88.1 |
| 100 | 1 | 20 | 4.8 |
| 100 | 4 | 70 | 8.0 |
| 100 | 8 | 450 | 24.7 |
| 100 | 24 | 2280 | 76.7 |
| 100 | 48 | 23200 | 79.7 |
| 100 | 72 | 34800 | 82.3 |
| 100 | 96 | 46400 | 81.7 |
| 100 | 120 | 47100 | 82.3 |
| 100 | 168 | 45800 | 81.9 |

EXAMPLE 3

The effect of catalyst concentration (—$SO_3H$) on octamethylcyclotetrasiloxane ($D_4$) polymerization was evaluated.

Sulfonated polyethylene sheeting prepared as described in Example 1 was contacted with $D_4$ by the same process as described in Example 1. The sheeting had 1.5 meg/g of sulfonic acid groups. Strips of the SPE were added to the reaction flask sufficient to provide the amounts of sulfonic acid equivalents described in Table 3. The SPE was contacted with about 67 mmol of $D_4$ at 90° C. for the time periods given in Table 3. Samples were removed from the reaction flask at each sampling time and viscosity and monomer conversion determined by the methods described in Example 1. The results of these analysis are reported in Table 3.

TABLE 3

Effect of Catalyst (—$SO_3H$) Concentration on $D_4$ Polymerization

| —$SO_3H$ (mmol) | Time (h) | Viscosity (cp) | Monomer Conversion (%) |
|---|---|---|---|
| 0.03 | 1 | 1 | 0.0 |
| 0.03 | 4 | 10 | 2.3 |
| 0.03 | 7 | 25 | 7.9 |
| 0.03 | 12 | 50 | 12.2 |
| 0.03 | 22 | 200 | 24.2 |
| 0.03 | 30 | 1230 | 45.6 |
| 0.37 | 1 | 1 | 1.6 |
| 0.37 | 4 | 25 | 12.0 |
| 0.37 | 7 | 85 | 19.7 |
| 0.37 | 12 | 120 | 34.4 |
| 0.37 | 22 | 835 | 73.9 |
| 0.37 | 30 | 2846 | 87.1 |
| 0.37 | 96 | 43820 | 89.4 |
| 0.37 | 120 | 43740 | 87.9 |
| 0.37 | 168 | 43100 | 88.1 |
| 0.80 | 1 | 1 | 3.6 |
| 0.80 | 4 | 35 | 14.1 |
| 0.80 | 7 | 95 | 23.0 |
| 0.80 | 12 | 160 | 52.0 |
| 0.80 | 22 | 1120 | 82.1 |
| 0.80 | 30 | 3400 | 94.1 |

EXAMPLE 4

The ability of sulfonated polyethylene hollow fibers to catalyze the polymerization of octamethylcyclotetrasiloxane was evaluated. Polyethylene hollow fibers were produced from low-density polyethylene chips. A fiber was spun having an inside diameter of 0.6 mm. A hollow fiber 90 cm in length was sulfonated by the process as described in Example 1, resulting in a hollow fiber having a sulfonic acid equivalence of 1.5 meq/g. The SPE hollow fiber was supported in a reactor heated to 90° C. A mixture comprising 20 mmol of $D_4$ and 1.0 mmol of hexmethyldisiloxane was circulated through the SPE hollow fiber from a reservoir at 5.0 ml/min. The viscosity of the material present in the reservoir was determined at the times given in Table 4. Viscosity was determined by the method described in Example 1. In run 5, no hexamethyldisiloxane was added to the process.

TABLE 4

SPE Hollow Fiber Catalyzed Polymerization of $D_4$

| Run No. | Time (h) | Viscosity (cp) |
|---|---|---|
| 1 | 6 | 1 |
| 2 | 12 | 5 |
| 3 | 24 | 15 |
| 4 | 33 | 40 |
| 5 | 10 | 80 |

We claim:

1. A process for siloxane bond rearrangement of polyorganosiloxanes, the process comprising:
contacting a polyorganosiloxane at a temperature within a range of about 20° C. to 110° C. with a rearrangement catalyst consisting essentially of solid sulfonated polyethylene.

2. A process according to claim 1, where the polyorganosiloxane is selected from a group consisting of linear polyorganosiloxanes described by formula

$R_3Si(OSiR_2)_pOSiR_3$ and cyclic polyorganosiloxanes described by formula

$(R_2SiO)_q,$ where each R is independently selected from a group consisting of hydrogen and monovalent substituted or unsubstituted hydrocarbon radicals comprising one to 30 carbon atoms, p is an integer equal to or greater than zero, and q is an integer greater than two.

3. A process according to claim 2, where each R is independently selected from a group consisting of methyl, vinyl, phenyl, and 3,3,3-trifluoropropyl.

4. A process according to claim 3, where greater than 90 mole percent of the R substituents are methyl.

5. A process according to claim 2, where p is a value within a range of about zero to 40.

6. A process according to claim 2, where q is a value within a range of about three to six.

7. A process according to claim 1, where the temperature is within a range of about 50° C. to 100° C.

8. A process according to claim 1, further comprising contacting the polyorganosiloxane with the catalyst in the presence of an inert organic solvent.

9. A process according to claim 1, where the solid sulfonated polyethylene is in the form of a hollow fiber.

10. A process according to claim 1, where the solid sulfonated polyethylene comprises about 0.1 to 5 meg of sulfonic acid groups per gram of solid polyethylene.

11. A process according to claim 1, where the process is run as a continuous process using multiple bundles of solid sulfonated polyethylene hollow-fibers through which the polyorganosiloxane is passed to effect rearrangement.

12. A process according to claim 4, where p is a value within a range of about zero to 40, q is a value within a range of about three to six, the temperature is within a range of about 50° C. to 100° C., and the solid sulfonated polyethylene comprises about 0.1 to 5 meg of sulfonic acid groups per gram of solid polyethylene.

* * * * *